United States Patent
Suominen

(10) Patent No.: US 6,909,025 B2
(45) Date of Patent: Jun. 21, 2005

(54) METHOD AND EQUIPMENT FOR PRE-TREATMENT OF USED TIRES BEFORE A PYROLYSIS PROCESS

(75) Inventor: Hannu L. Suominen, Maple Grove, MN (US)

(73) Assignee: BCDE Group Waste Management, Ltd., Oy (FI)

( * ) Notice: Subject to any disclaimer, the term of this patent is extended or adjusted under 35 U.S.C. 154(b) by 453 days.

(21) Appl. No.: 10/003,246

(22) Filed: Dec. 6, 2001

(65) Prior Publication Data

US 2003/0109761 A1 Jun. 12, 2003

(51) Int. Cl.[7] .............................. C07C 4/02; C10G 1/10
(52) U.S. Cl. .......................... 585/241; 201/19; 201/25; 423/449.7
(58) Field of Search .......................... 585/241; 201/19, 201/25; 423/449.7; 202/241

(56) References Cited

U.S. PATENT DOCUMENTS 4,647,443 A * 3/1987 Apffel ..................... 423/449.7

6,651,818 B1  11/2003  Ilmasti et al.

OTHER PUBLICATIONS

Teng, H. et al., Industrial and Engineering Chemistry Research: Reprocessing of Used Tires into Activated Carbon and Other Products, vol. 34, Issue 9, pp. 3102–3111, Sep. 1995.*

* cited by examiner

Primary Examiner—Walter D. Griffin
Assistant Examiner—Tam M. Nguyen
(74) Attorney, Agent, or Firm—Connolly, Bove, Lodge & Hutz LLP

(57) ABSTRACT

The present invention concerns a method and an equipment for pre-treatment of used tires (1) before a pyrolysis process. The invention is characterized in that said cleaning of each tire (1) is carried out in a closed chamber (5) with high pressure air jets. Air contaminated with dust and other dirt particles from said tire (1) is preferably continuously conducted through an air cleaning device (10) for removing said dust and other dirt particles from the air, and received cleaned air is fed to a high pressure blower (8) for producing said high pressure air jets.

3 Claims, 2 Drawing Sheets

Figure 1:
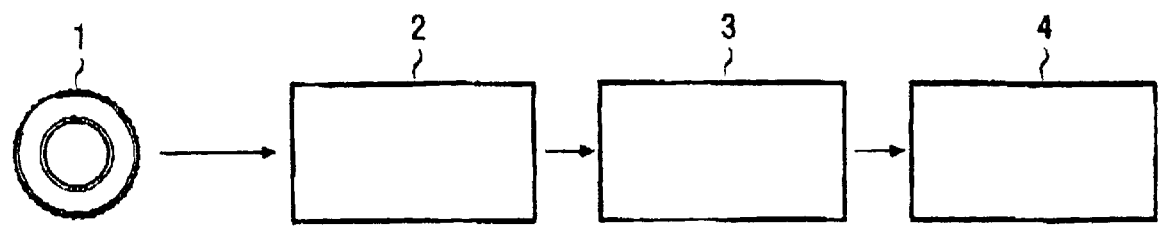

METHOD AND EQUIPMENT FOR PRE-TREATMENT OF USED TIRES BEFORE A PYROLYSIS PROCESS

The present invention concerns a method and an equipment for pre-treatment of used tyres before a pyrolysis process.

In previously known pyrolysis processes tyres have been washed by water, which will require increased heating energy to remove all water from the tyres. Further such water washing result in considerable waste water problems due to the enormous amount of water required.

According to previous pyrolysis techniques the tyres have been mechanically torn to pieces before they have been brought to the pyrolysis process, which will require enormous mechanical energy resulting in high maintenance costs.

The object of the present invention is to eliminate the above problems, which is achieved with a method according to which each tyre is cleaned in a cleaning station with high pressure air jets before it is fed to a first heating stage of the pyrolysis process. The equipment according to the present invention comprises a cleaning chamber provided with a number of air nozzles for cleaning each tyre with high pressure air jets. Because no water is used there will be no waste water problem and no excess water have to be removed from the tyres during the fist heating stage.

Preferably cleaning of each tyre is carried out in a closed chamber, whereby air contaminated with dust and other dirt particles from the tyre is continuously conducted through an air cleaning device for removing said dust and other dirt particles from the air, and received cleaned air is fed to a high pressure blower for producing said high pressure air jets.

Cleaning of said air is preferably carried out by means of a high voltage electric field between a central charging electrode provided with radially directed tips having a first polarity and a cylindrical collecting electrode of opposed electric polarity, surrounding said charging electrode, when contaminated air is fed through said electric field. By means of such air cleaning no contaminated air will get into the environment from the cleaning process.

According to one embodiment of the invention, the cleaned tyres are fed as whole tyres into said first heating stage or chamber. Hereby no extra energy is required to mechanically torn the tyres to pieces or otherwise disintegrate the tyres before entering the first heating stage, which mechanical treatment will require enormous energy and economical recourses due to high operation and maintenance costs. A further considerable advantage by feeding whole non-disintegrated tyres into the pyrolysis process is that metal cords from said tyres will be received as flat metal plates at the bottom of a wagon or cage into which said tyres have been charged when fed into the pyrolysis process.

In order to be able to charge more tyres at the same time into the pyrolysis process the cleaned tyre can preferably be compressed to a block of reduced size before it is fed to said first heating stage.

Said compression is preferably carried out in a compression station between said cleaning chamber and said first heating chamber. Said compression station is preferably provided with hydraulically operated compressing means for compressing each tyre to a block of reduced size. A cleaned tyre is intended to be rolled into the compression station along a narrow path ending at a vertical stop plate, whereby said compressing means comprise a vertical and a horizontal hydraulic cylinder piston device being operated to compress a tyre fed into said station against said vertical stop plate and path bottom, respectively.

Figure 2:
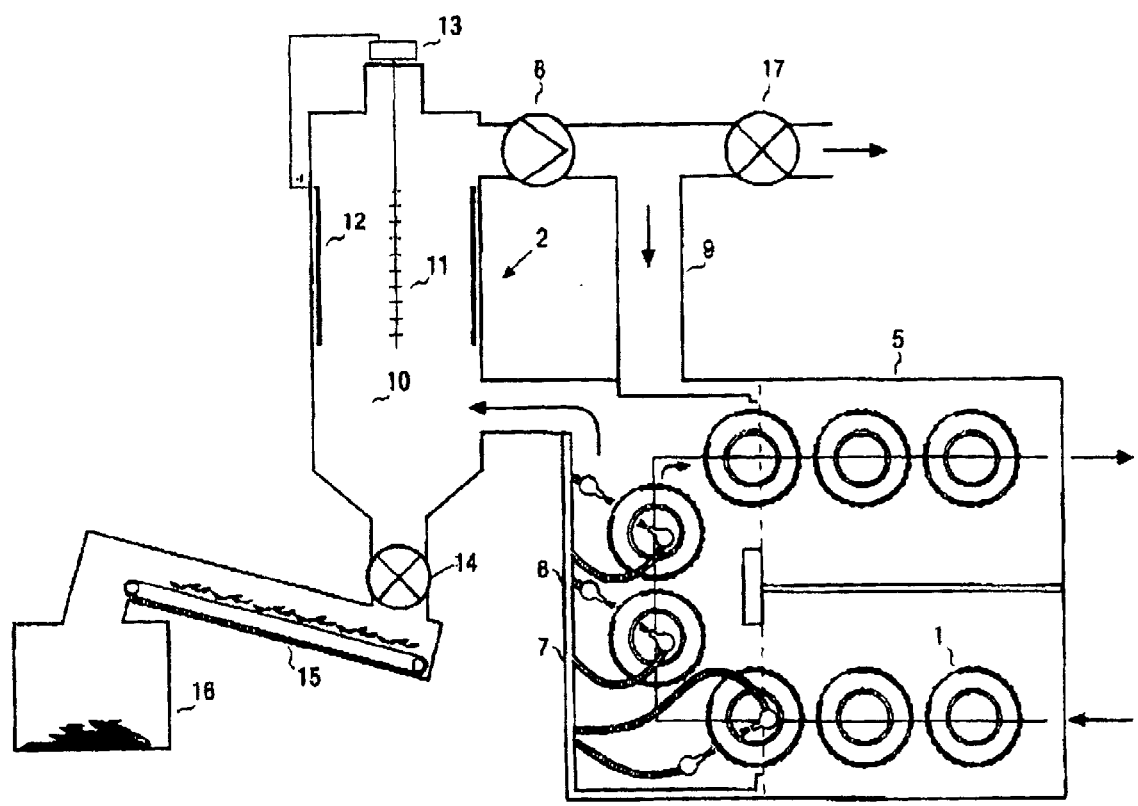
Figure 3A:
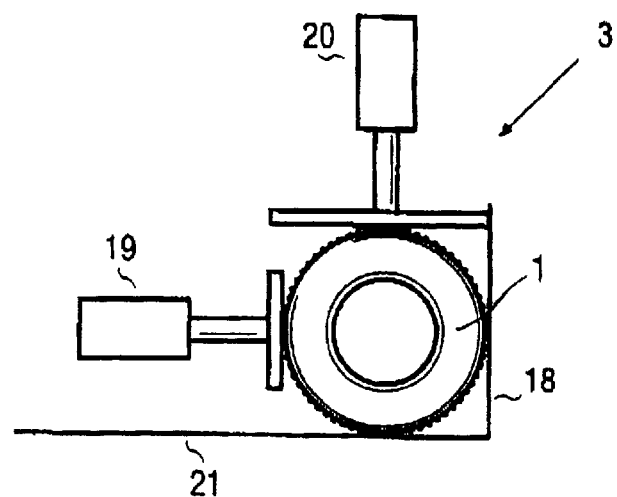
Figure 3B:
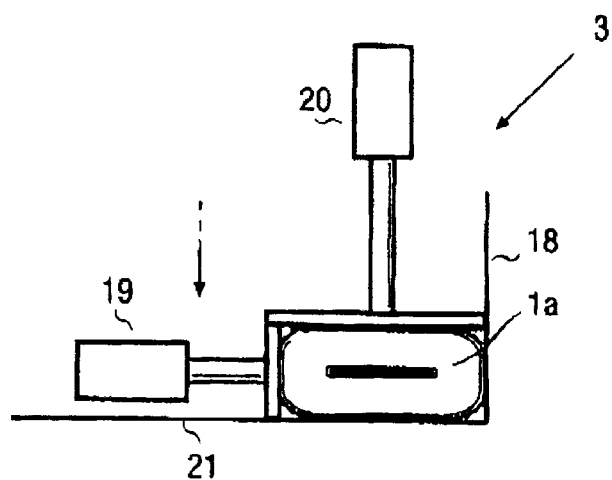
Figure 3C:
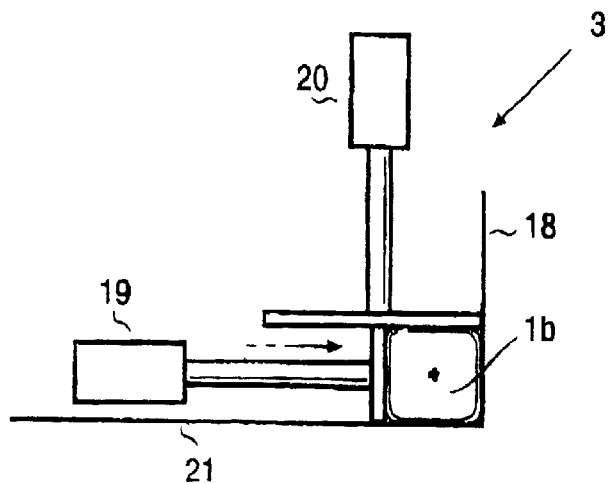

The invention will now be described in more detail with reference to the enclosed drawing, wherein FIG. 1 shows schematically a flow scheme of a preferred pre-treatment equipment according to the present invention, FIG. 2 shows schematically a side view of a cleaning station according to the invention, and FIGS. 3a to 3c show different stages of compression of a tyre before entering a first heating stage.

A tyre 1 to be fed to a pyrolysis process is according to a preferred embodiment of the present invention first cleaned with high pressure air jets in a cleaning station 2. The cleaned tyre is then fed to a compression station 3 to be compressed to a block of reduced size and said block is fed further to a first heating stage 4 of the pyrolysis process.

The cleaning station 2 comprises a chamber 5 which can be closed. Said chamber 5 is provided with air nozzles 6, 7 which during a cleaning process are directed to the outer and the inner surfaces of each tyre 1 transported through said cleaning chamber 5, which tyres are rotated around their own axis during said cleaning process. Said nozzles 6, 7 receive high pressure air from a high pressure blower 8. In order to clean air contaminated with dust and other dirt particles from the tyre 1, the cleaning station is provided with an air cleaning circuit 9 including an air cleaning device 10 and said high pressure blower 8.

The air cleaning device 10 comprises a central charging electrode 11 provided with radially directed tips and a cylindrical collecting electrode 12 surrounding said charging electrode 11. A high voltage electric field is provided between said electrodes 11, 12 by connecting them to opposite poles of a high voltage current source 13. Due to corona phenomena at the tips of said charging electrode 11 ion jets will flow from the said tips towards said collecting electrode 12 charging all particles in the contaminated air stream and forcing the to adhere to the inner surface of said collecting electrode 12. said particles are intermittently removed from said surface and transported by means of a block feeder 14 and a conveyor 15 to a container 16 below said air cleaning device 10. The cleaned air is conveyed from the air cleaning device 10 along the circuit 9 to the high pressure blower 8 as mentioned above. Thus the air will continuously be circulated and reused in the cleaning chamber 5. By means of a control valve 17 a part of the clean high pressure air from the blower 8 can be led out into the atmosphere.

According to the disclosed preferred embodiment the cleaned tyre 1 is fed to a compression station 3 provided with hydraulically operated cylinder piston devices 19, 20. The tyre 1 is rolled along a narrow path 21 into said compression station 3 into contact against a vertical stop plate 18, whereby a vertical cylinder piston device 20, positioned above said tyre 1 is activated and will compress the tyre 1 downwards against path bottom, as schematically indicated in FIG. 3b, whereby a flat oblong rubber block 1a is received. Then a horizontal cylinder piston device 19 is activated and will compress the flat oblong rubber block against said stop plate 18, whereby a substantially cubic shaped rubber block 1b of further reduced size is received, as indicated in FIG. 3c. By compressing the tyres in this way before entering the first heating stage 4 the risk of possible air pockets within the tyres is considerably decreased.

What is claimed is:

1. A method for pre-treatment of used tires before a pyrolysis process, comprising:

cleaning at least one tire with high pressure air jets in a closed chamber of a cleaning station prior to feeding said at least one tire to a first heating stage of said pyrolysis process;

continuously conducting contaminated air through an air cleaning device, wherein said contaminated air contains dust and other dirt particles from said at least one tire;

removing said dust and said other dirt particles from said contaminated air in said cleaning device to produce cleaned air, wherein removing said dust and said other dirt particles from said contaminated air is accomplished by providing a high voltage electric field between a central charging electrode of a first polarity and a collecting electrode of a second polarity opposite said first polarity, and wherein said central charging electrode includes radially directed tips; and feeding said cleaned air to a high pressure blower to produce said high pressure air jets.

2. A method for pre-treatment of used tires before a pyrolysis process, comprising:

cleaning at least one whole tire in a cleaning station with high pressure air jets; and subsequently feeding said at least one whole tire into a first heating stage of said pyrolysis process.

3. A method for pro-treatment of used tires before a pyrolysis process, comprising:

cleaning at least one whole tire in a cleaning station with high pressure air jets;

subsequently compressing said at least one whole tire into a black of reduced size; and subsequently feeding said block into a first heating stage of said pyrolysis process.

* * * * *